Dec. 31, 1935.  C. C. CADDEN  2,025,801
APPARATUS FOR CUTTING AND WEIGHING LENGTHS OF MATERIAL
FROM A CONTINUOUS STRIP THEREOF
Filed Dec. 14, 1931   5 Sheets-Sheet 1
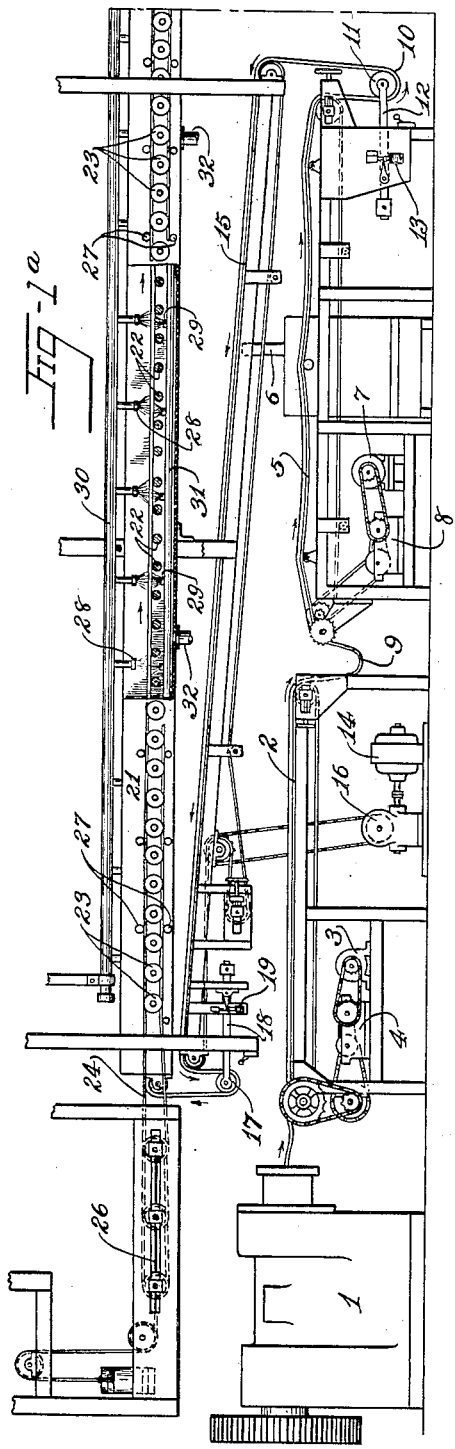
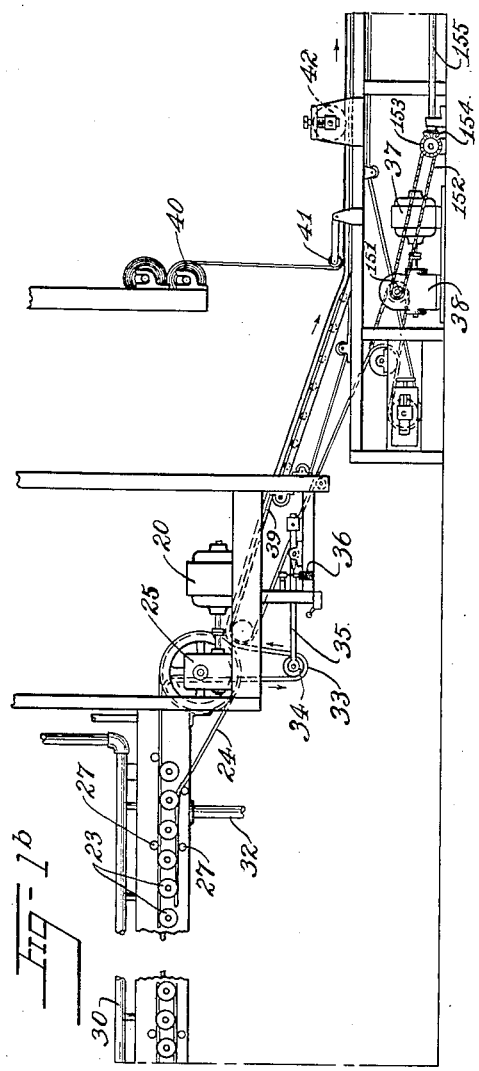
Inventor
Charles C. Cadden
By Eakin & Avery
Attys.

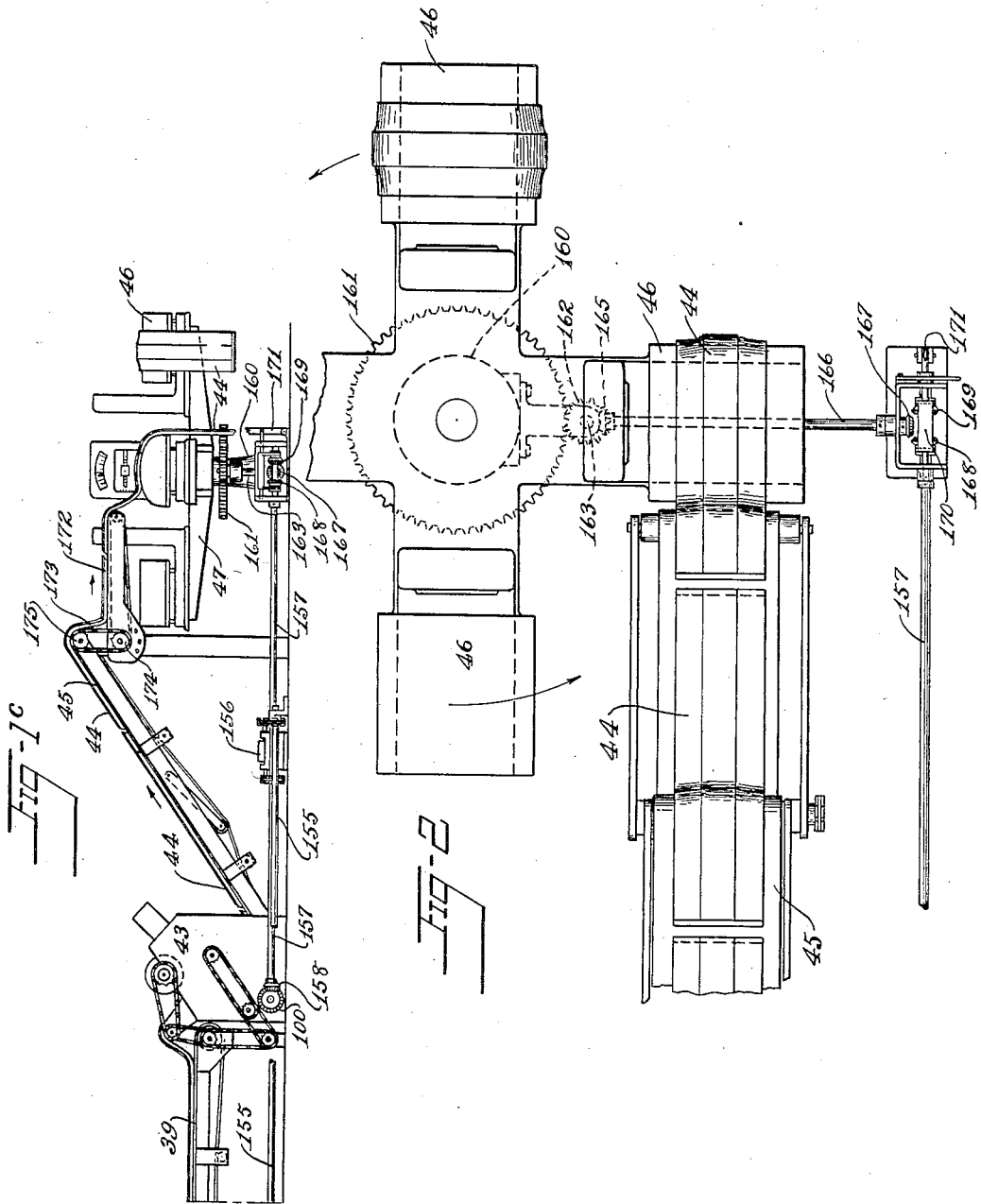

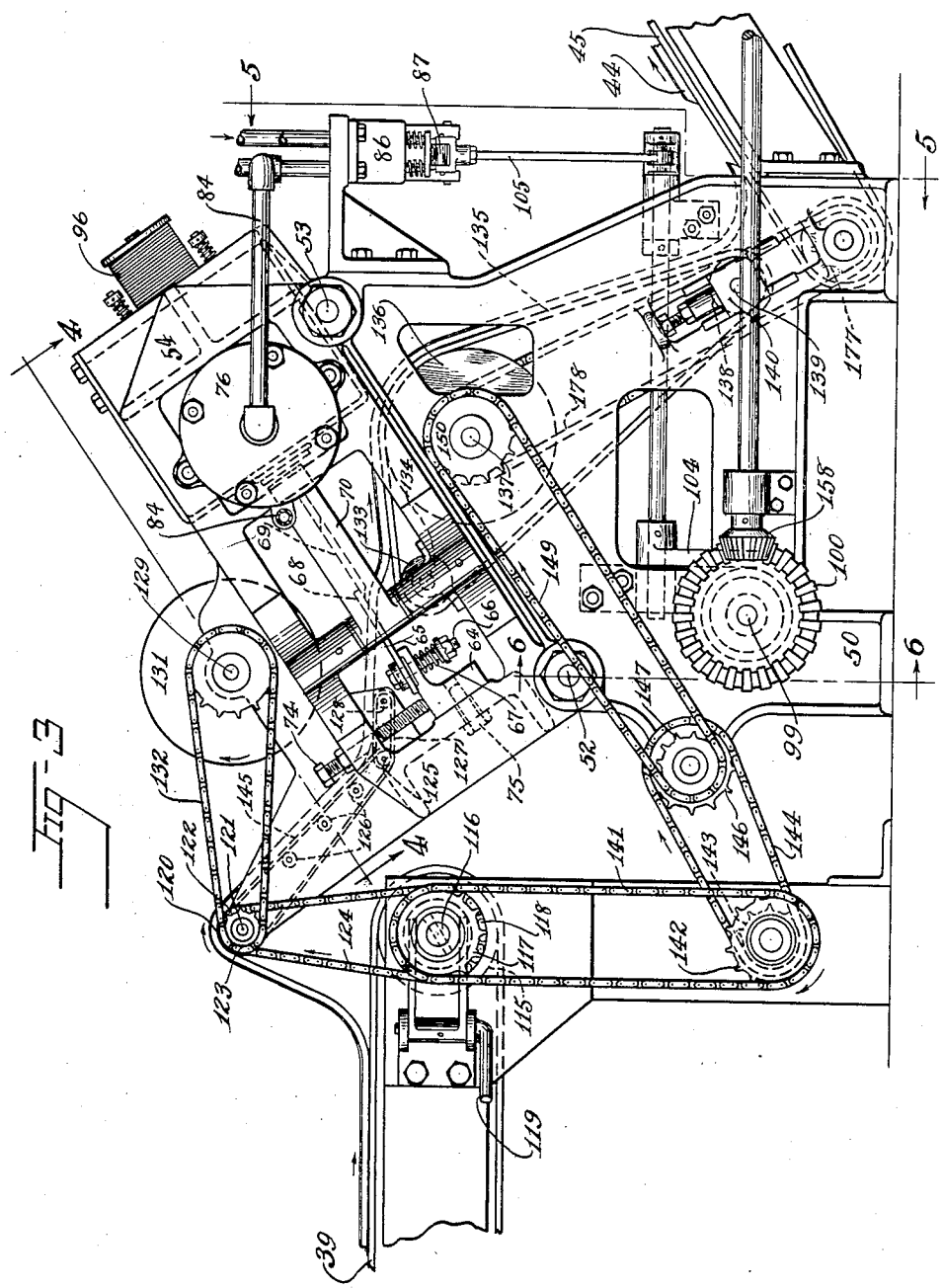

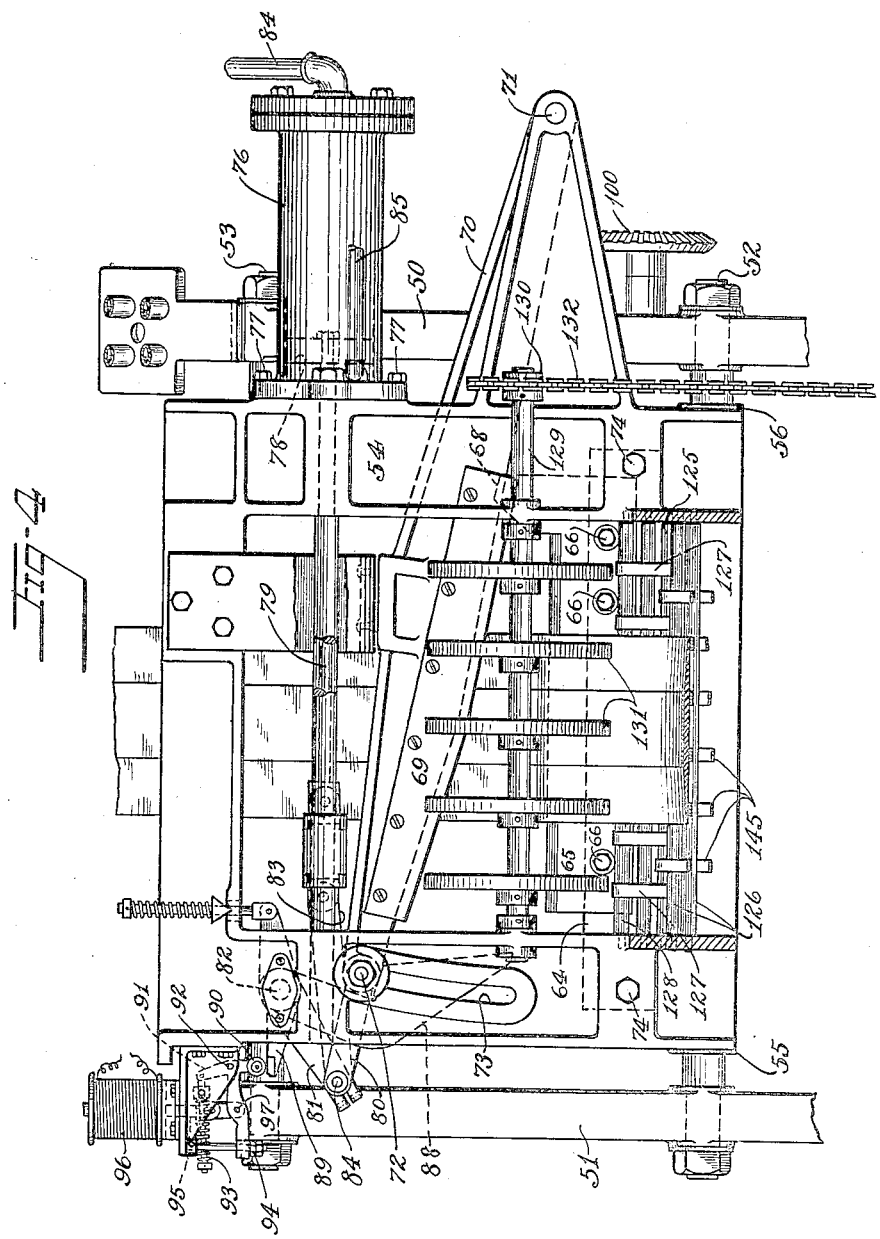

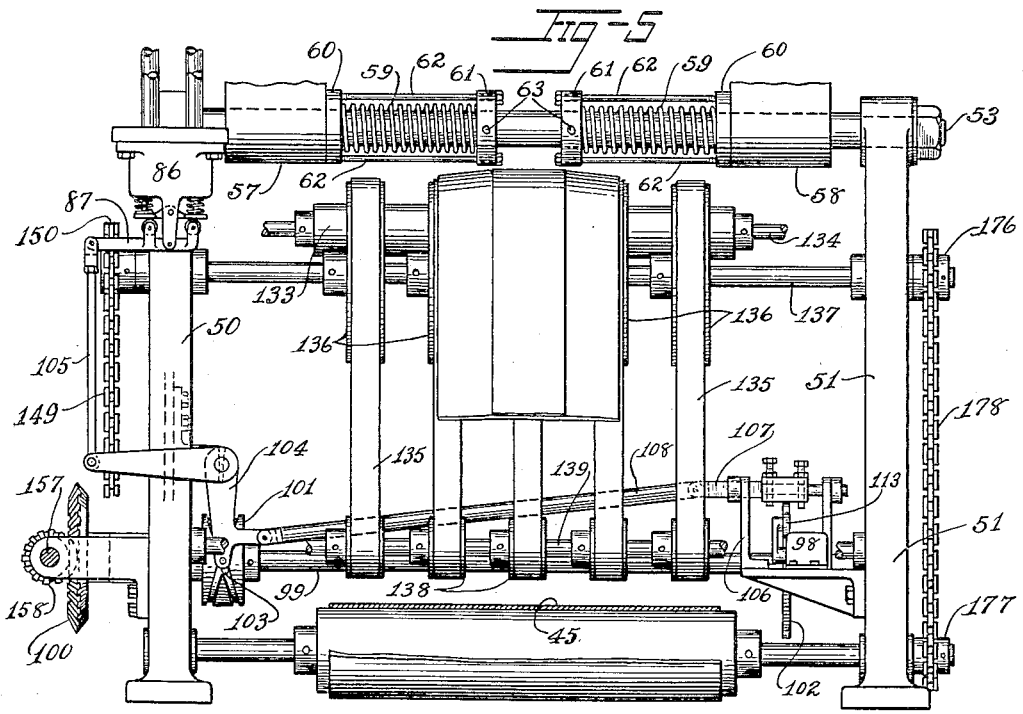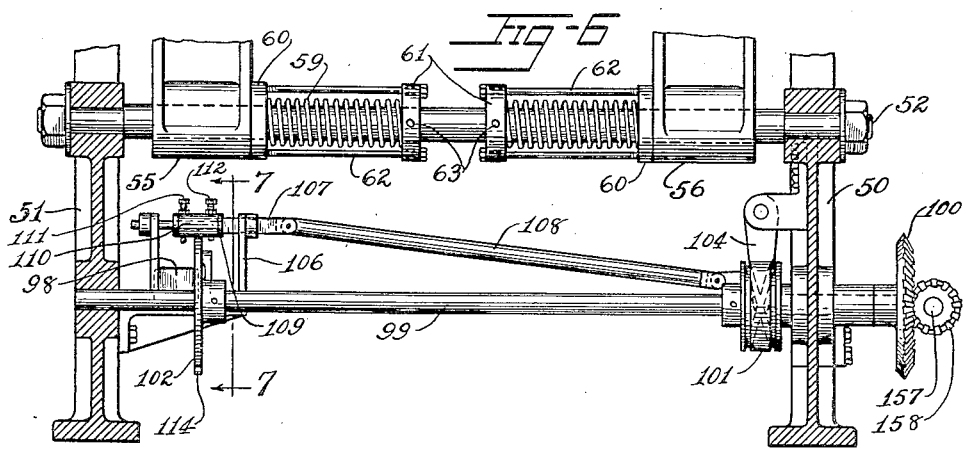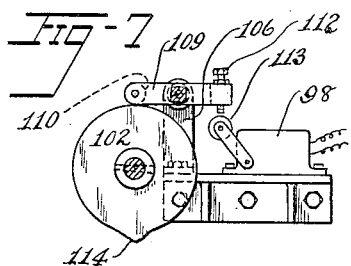

Patented Dec. 31, 1935

2,025,801

UNITED STATES PATENT OFFICE 2,025,801

APPARATUS FOR CUTTING AND WEIGHING LENGTHS OF MATERIAL FROM A CONTINUOUS STRIP THEREOF

Charles C. Cadden, Akron, Ohio, assignor to The B. F. Goodrich Company, New York, N. Y., a corporation of New York Application December 14, 1931, Serial No. 580,810

7 Claims. (Cl. 265—27)

The invention relates to apparatus for cutting and weighing lengths of material from a continuous strip thereof and is particularly adapted to the cutting and weighing of lengths of material used in the manufacture of rubber articles such as automobile tires.

The principal objects of the invention are to maintain uniformity of product and to perform the required operations with a minimum amount of labor and without interrupting the travel of the strip.

Other objects will appear from the following description and the accompanying drawings.

Referring to the drawings:

Fig. 1a is a side elevation of part of the strip forming apparatus.

Fig. 1b is a continuation thereof, a portion being broken away.

Fig. 1c is a further continuation thereof showing the cutting and weighing apparatus.

Fig. 2 is a plan view of the delivery end of the apparatus and weighing mechanism, parts being broken away.

Fig. 3 is a side elevation of the cutting mechanism, other connecting parts being broken away.

Fig. 4 is an angular plan view taken perpendicular to the cutting plane on line 4—4 of Fig. 3, parts being broken away.

Fig. 5 is a detail view in end elevation taken on line 5—5 of Fig. 3, showing the measuring mechanism, parts being broken away.

Fig. 6 is a detail view partly in section taken on line 6—6 of Fig. 3 showing the measuring mechanism from the rear of Fig. 5.

Fig. 7 is a detail view of the measuring cam and switch in elevation, taken on line 7—7 of Fig. 6.

Referring to the drawings and particularly to Figs. 1a, 1b, and 1c, the numeral 1 designates a device such as an extruding mechanism for forming a continuous slab or strip of rubber material which is delivered onto a conveyor belt 2 driven by an electric motor 3 through a speed-adjusting device 4. As the extruded material passes over this conveyor it is occasionally measured as to width. The speed-adjusting device may be regulated to cause the material to be conveyed at the velocity of its delivery from the extruding machine.

The slab of material passes from conveyor belt 2 over a weighing belt 5 where its weight for a given length is indicated on a scale 6 in view of the operator at the extruding machine, the scale being so adjusted as to indicate whether the weight of the slab is correct or over or under the standard. The weighing conveyor is driven by a motor 7 through a speed changing device 8 and the slab of material is allowed to accumulate in loops 9 and 10 adjacent the weighing conveyor. A balanced roller 11 on a pivoted arm 12 is enclosed by the loop 10 and controls the travel of the slab beyond the measuring conveyor by actuating a switch 13 in the control circuit of a motor 14 which drives the succeeding conveyor, the arrangement being such that lowering of the roll 11 makes an electrical contact which increases the speed of the motor 14 and raising of the roll makes a different contact and decreases the speed of the same motor.

The slab after leaving the measuring conveyor passes to a belt conveyor 15 which is driven by the motor 14, previously mentioned, through a worm reduction gear 16.

On leaving conveyor belt 15 a loop of the slab is engaged by a balanced idler roller 17 on a pivoted arm 18 which through an electric switch 19 controls the speed of a motor 20 in the same manner as the roll 11 previously described controls the motor 14.

The slab passes from conveyor belt 15 to a tank 21 provided with a series of live rolls 22, each having a driving pulley 23 outside the tank, the pulleys 23 being driven by endless V-belts 24 from motor 20 through a reduction gear 25. A tension device 26 maintains the V-belts under tension and idle pulleys 27 mounted on the tank wall maintain contact between the V-belts and pulleys. Three such V-belts are provided and are driven in unison. Each belt contacts with every third pulley 23, the pulleys being set on the shafts of the rolls 22 in such relation as to align every third pulley with the same belt. The rollers 22 comprise a cooling conveyor for supporting the slab.

As the slab passes over the cooling conveyor it is cooled by spray heads 28 from above and spray heads 29 from below with water supplied by pipes 30 and 31, and the water flows away through drains 32 provided in the tank 21.

The cooling of the slab causes shrinkage thereof in length and in order to prevent undue stretching thereof the various motors previously mentioned are so controlled by the loops of the slab between the various conveyors as to drive the conveyors succeeding them without substantial tension on the slab as previously described. In order to compensate for any shrinkage that may take place after the slab leaves the cooling conveyor, a loop 33 is formed therein which engages a balanced roll 34 on a pivoted arm 35, which through a switch 36 controls the speed of a motor 37 which through a reduction gear 38 drives a conveyor 39.

Where other materials such as fabric or rubber strips are to be assembled with the slab, such assembling may conveniently be accomplished on conveyor belt 39 and such strips may be drawn from a supply roll 40 above the belt, the assembled material being pressed together by pressure rollers 41 and 42.

The material now passes to a cutting mechanism 43, hereinafter described, which cuts the slab into predetermined lengths without interrupting the travel of the slab. The severed lengths of slab material are designated by the numeral 44 and are conveyed from the cutting mechanism over belt conveyors 45 and 172 which deposit them in succession on successive scale pans 46 of scales carried by a turnstile 47 which rotates in unison with the conveyor 45.

The cutting mechanism is constructed as follows: End frame members 50 and 51 are held in spaced relation by rods 52 and 53 which are reduced at each end where they pass through the frames and their reduced ends are threaded to engage clamping nuts. A floating frame member 54 is slidably mounted on rods 52 and 53, being provided with ears 55 and 56 for engaging rods 52 and with ears 57 and 58 for engaging rod 53. Each of these rods is provided with buffer mechanism to hold each ear in its normal position. The buffer mechanism comprises a coil spring 59 held under tension between loose collars 60 and 61 by bolts 62 which slidably engage collars 61. Bolts 62 have threaded ends which engage tapped holes in collar 60 which is slidably mounted on the rod. Collar 61 is pinned to the rod as at 63. The purpose of the buffer mechanism is to absorb the vibration and shock of the cutting knife operating mechanism which is mounted on frame 54.

The frame 54 supports a bar 64 on which a stationary shear blade 65 is held by bolts 66. Springs 67 encircling bolts 66 hold the blade 65 against the bar 64. Blade 65 is angularly continued at one end to form an extension 68. A movable shear blade 69 is mounted on an arm 70 pivoted at 71 to an extension of frame 54 and provided with a pin 72 which engages an arcuate guide slot 73 in frame 54, the arrangement being such that extension 68 of blade 65 always engages the movable blade 69 and during the movement of blade 69 the springs 67 hold the blades in contact. Bar 64 is adjustable on frame 54 and may be adjusted by screws 74 passing through said frame and locked by screws 75 to hold it when adjusted, the screws 75 passing through slots in frame 54.

To actuate the shear blade 69 at a high velocity so as to cut the slab without interrupting its movement, I provide an air cylinder 76 which is mounted on the frame 54 by bolts 77. A piston 78, located in this cylinder, is adapted to be forced in either direction by compressed air and actuates a piston rod 79. A toggle link 80 is pivoted to pin 72. A second toggle link 81 is pivoted at 82 to frame 54, and a connecting rod 83 has one end pivoted at 84 to links 80 and 81, and its other end pivoted to piston rod 79. At each single stroke of the piston rod the shear blade 69 will move toward blade 65 and return.

The cylinder 76 has a single port at each end. Pipes 84 and 85 connect these ports to a valve 86 having an operating arm 87, the arrangement being such that when arm 87 is rocked in one direction one end of the cylinder is connected to the air supply line and the opposite end simultaneously connected to the exhaust line, and when the arm 87 is rocked in the other direction the supply and exhaust are reversed.

In order to accurately time the strokes of the piston 78, I provide shear blade releasing and holding mechanism as follows: A hook 88 is pivoted to frame 54 at 82 and engages under pin 72 when the blade 69 is at its extreme open position as shown in Fig. 4, in which position it is normally held by an arm 89 integral with hook 88 engaging a roller 90 on an arm 91 which is pivoted at 92. Arm 91 is held in the position shown by a spring 93 and a stop 94. An armature 95 is located in a solenoid 96 and is connected at 97 to arm 91, the arrangement being such that energizing of solenoid 96 will deflect arm 91 and release arm 89, whereupon pressure of the compressed air in cylinder 76 will cause the movable shear blade to travel.

Solenoid 96 is connected in series with a source of direct current supply and a switch 98. A timing shaft 99 rotatably mounted in frame members 50 and 51 has a bevel gear 100, a drum cam 101 and a plate cam 102 pinned or otherwise secured thereon. Drum cam 101 is formed with a continuous circumferential groove which extends in a plane perpendicular to its axis of rotation throughout 180 degrees of its extent, is helical throughout the next 180 degrees, extends in a second plane perpendicular to the axis throughout the next 180 degrees, and is helical throughout the remainder of its extent, the second helix intersecting the first and meeting the starting point, as illustrated in Figs. 5 and 6. Traveller 103 is lentil shaped. It completes the circuit of the groove during every two successive revolutions of the shaft 99. Traveller 103 is pivoted on one arm of bell-crank lever 104, the other arm of which is connected by a link 105 to valve arm 87, the arrangement being such that during one revolution of shaft 99, arm 87 will be tipped in one direction to charge one end of cylinder 76 and during the succeeding revolution will be tipped the other way charging the other end of the cylinder.

Mounted on frame member 51 near cam 102 is a bracket 106 in which a rod 107 is slidably mounted. One end of rod 107 is connected by a link 108 to bell crank lever 104. An arm 109 pivoted on rod 107 carries a wide roller 110 which rides on cam 102 at any position of rod 107. A pair of adjustable contact screws 111 and 112 are provided on arm 109 and at extreme positions of rod 107 stand above a switch actuating roller 113 on switch 98. Cam 102 has a circular contour except for a projection 114 adapted to raise roller 110 and depress switch arm 113. As the cutting mechanism is to operate while the material is advanced therethrough at a uniform velocity and it has been found that the time required for movement of the movable shear blade varies slightly according to the direction of piston travel, due to the fact that the action of the toggle mechanism is not the same at consecutive strokes, the contact screws 111 and 112 are advanced by different amounts and the solenoid 96 is therefore energized sooner during one of the successive movements to compensate for the difference in sheer timing.

The conveyor belt 39 passes around a drum 115 at its delivery end. Drum 115 is fast to a shaft 116. A pair of similar sprockets 117, 118 are loosely mounted on shaft 116 but may be connected thereto by a clutch (not shown) operated by a clutch handle 119. A feed roller 120 is fixed to a shaft 121, journaled in frame 54, which shaft has fixed thereto a pair of similar sprockets 122, 123. A chain 124 surrounds sprockets 118 and 123 and drives roll 120 at the same surface speed as conveyor 39. A series of narrow flat belts 145 are driven by roll 120 and in turn drive a roll 125. Idler rolls 126 underlie the upper reaches of the belts. A second set of narrow feed belts 127 surround roller 125 between belts 124 and drive a roll 128 therefrom.

A shaft 129 journaled in frame 54 has fixed thereto a sprocket 130 and a series of discs 131. A chain 132 drives sprocket 130 from sprocket 122.

The slab of material leaving conveyor 39 is led over roll 120 and over belts 145 and 127 which direct it at an angle to the cutting plane of the shear blades. Should any buckling of the slab take place between roller 120 and the blades, the discs 131 which travel in a direction reverse to that of the slab will contact with the buckled portion and prevent it from entering the shear blades.

A roll 133 mounted on a shaft 134 journaled in frame 54 supports a plurality of narrow belts 135 which pass over pulleys 136 mounted on a shaft 137 journaled in frame members 50 and 51 and tension pulleys 138 mounted on a shaft 139, journaled in adjustable bearings 140, slidably mounted in said frame members. Belts 135 are driven from sprocket 117 through chain 141, sprocket 142, sprocket 143, chain 144, sprockets 146 and 147, chain 149 and sprocket 150, mounted on shaft 137, the arrangement being such that belts 135 are driven at the same velocity as conveyor 39 and serve to convey the severed sections of the slab from the shear blades.

As the slab of material is delivered by the conveyor 39 at a variable rate it is necessary that the measuring shaft 99 be driven in synchronism therewith to maintain a particular length of slab sections. For this purpose reducing gear 38 through which conveyor 39 is driven carries a sprocket 151 (see Fig. 1b) which through a chain 152 and bevel gears 153 and 154 drives a shaft 155. Shaft 155 drives an adjustable speed changing mechanism 156 which in turn drives a shaft 157. Shaft 157 has a bevel pinion 158 thereon which engages a bevel gear 100 on the measuring shaft 99.

The adjustable speed changing mechanism 156 is of the well known Reeves type and the speed changing hand wheel is equipped with a pointer, not shown, which indicates on a dial, not shown, the relative position of adjustment. The dial is graduated to arbitrarily indicate the length of slab sections to be cut to enable the operator to set the speed of the measuring shaft in proper relation to the velocity of the slab.

In order to check the severed sections it is desirable to weigh either each section or a certain portion of the output of the machine. For this purpose the turnstile base 160 is provided to rotatably support the turnstile 47 on a vertical axis. A gear 161 mounted on the turnstile is adapted to be driven by a pinion 162 mounted on a vertical shaft 163. The lower end of shaft 163 carries a bevel gear 164, not shown, which is engaged by a bevel gear 165 on a shaft 166 which also carries a bevel gear 167 at its outer end. A pair of bevel pinions 168 and 169 are featherkeyed to shaft 157 and are mounted in a yoke 170. These gears may be alternately engaged with gear 167 by shifting yoke 170 along shaft 157. A lever 171 actuates the yoke for this purpose. At mid-position neither gear is engaged and the turnstile 47 may be rotated in either direction by hand. Since the turnstile is rotated by shaft 157 its turning movements are synchronous with the cutting of the slab sections and the ratio of the gearing is such that for every stroke of the shear blade one of the arms of the turnstile passes under the end of conveyor 172 which is driven by conveyor 45 through chain 173 and sprockets 174 and 175.

The turnstile 47 normally is rotated in the direction shown in Fig. 2 by the arrows so that the scale pans 46 contact with the side of the slab sections which was adjacent the conveyor belts. In some cases however it is desirable to rotate the turnstile in the opposite direction as when other materials are to be assembled with the slab on conveyor 39.

Conveyor 45 is driven from shaft 137 by sprockets 176 and 177 and chain 178, the ratio of the sprockets being such that conveyor 45 runs faster than belts 135 and spaces the slab sections apart.

I claim:

1. Apparatus for cutting and weighing sections of strip material from a continuous length thereof, said apparatus comprising strip advancing means, means for cutting sections from said strip as the strip is advanced, weighing means for individually conveying the sections from the cutting means, means for driving said cutting means and said weighing means in unison, and means for adjusting said driving means relative to the velocity of the advancing strip.

2. Apparatus for cutting and weighing sections of strip material from a continuous length thereof, said apparatus comprising strip advancing means, means for cutting sections from the strip as it is advanced, a weighing turnstile having arms each supporting weighing means, means for driving the turnstile in synchronism with said cutting means, and a conveyor adapted to receive the sections and deposit them on the successive weighing means of the turnstile.

3. Apparatus for cutting and weighing sections of strip material from a continuous length thereof, said apparatus comprising means for continuously advancing the strip, means for cutting sections therefrom as the strip is advanced, means for spacing the sections, a turnstile having arms each provided with weighing means, means for rotating the turnstile in unison with the cutting means, and means for depositing the sections in succession on the weighing means of successive arms of the turnstile.

4. Apparatus for producing sections of strip material from a progressively formed continuous length thereof, said apparatus comprising means for progressively advancing said material, a plurality of traveling weighing devices, means for cutting sections from the advancing material without interrupting the advance thereof and depositing said sections on successive traveling weighing devices, means for adjusting the timing of the cutter and weighing means with relation to the velocity of advance of the leading end of the strip, and means independent thereof for varying the velocity of advance of the leading end of the strip to conform to the amount of shrinkage of the strip.

5. Apparatus for cutting and weighing sections of strip material, said apparatus comprising means for advancing the strip through a cutting device and partially draping it over a weighing member, cutting means for severing sections from said strip as it is advanced and means for bodily withdrawing said weighing member individually to withdraw the severed sections and to complete the draping thereof upon said weighing member.

6. Apparatus for cutting and weighing sections of strip material from a continuous length thereof, said apparatus comprising means for advancing the strip through a cutting member to present its leading end in hanging relation, a cutting member for severing sections from the strip as it is advanced, a bodily movable weighing scale adapted to engage the hanging part of a severed section, and means for withdrawing the weighing scale with the severed strips from the advancing means.

7. Apparatus for manipulating a strip of plastic material, said apparatus comprising means for continuously advancing a strip in sections in spaced relation, a turnstile disposed in the path of said sections and having a series of weighing arms, and means for so rotating the turnstile in timed relation with the strip advancing means that successive advancing sections are draped upon the successive rotating weighing arms.

CHARLES C. CADDEN.